United States Patent

[11] 3,614,003

| [72] | Inventor | Gustavo Tremolada<br>Milan, Italy |
|---|---|---|
| [21] | Appl. No. | 785,409 |
| [23] | | Division of Ser. No. 497,375, Oct. 18, 1965, Pat. No. 3,456,886 |
| [22] | Filed | Sept. 10, 1968 |
| [45] | Patented | Oct. 19, 1971 |
| [73] | Assignee | A. Tonolli & C. S.p.A.<br>Milan, Italy |
| [32] | Priority | Nov. 19, 1964 |
| [33] | | Italy |
| [31] | | 24722/64 |

[54] APPARATUS FOR SELECTIVELY CRUSHING OF STORAGE BATTERIES AND SEPARATING THE COMPONENT MATERIALS
5 Claims, 4 Drawing Figs.

[52] U.S. Cl. ............................................ 241/79.3, 241/284
[51] Int. Cl. ........................................ B02c 17/02, B02c 17/04
[50] Field of Search ............................................ 241/70, 79.3, 177, 181, 183, 284, 91

[56] References Cited
UNITED STATES PATENTS

| 262,652 | 8/1882 | Dodge | 241/91 |
|---|---|---|---|
| 843,466 | 2/1907 | Krickbaum | 241/181 UX |
| 1,309,212 | 7/1919 | Marcy | 241/181 X |
| 1,312,173 | 8/1919 | Gerlach | 241/14 X |
| 1,702,759 | 2/1929 | Barber | 241/14 UX |

FOREIGN PATENTS

| 416,545 | 8/1910 | France | 241/177 |

Primary Examiner—Donald G. Kelly
Attorney—Stevens, Davis, Miller & Mosher

ABSTRACT: Apparatus for breaking up scrap lead storage batteries and for the screen separation of the active material thereof in a substantially pure state as powder or fine granules, from the other material of the batteries, comprising a revolving drum the axis of which is inclined towards the discharge end, the walls of the drum being furnished with lifting wings extending in the axis direction for lifting and dropping batteries and their parts.

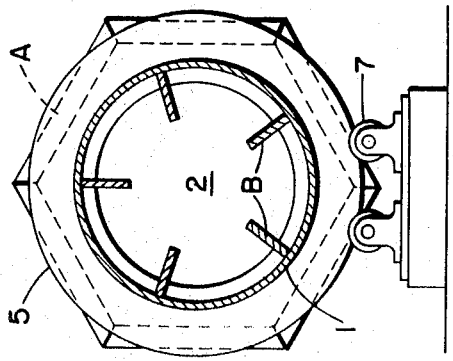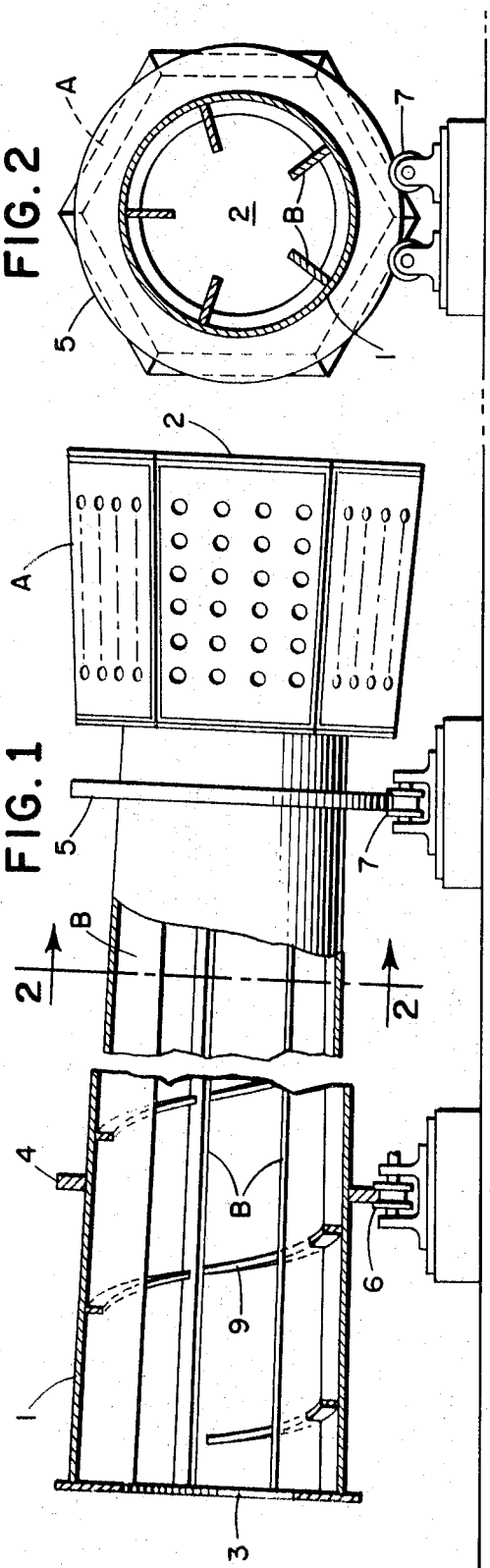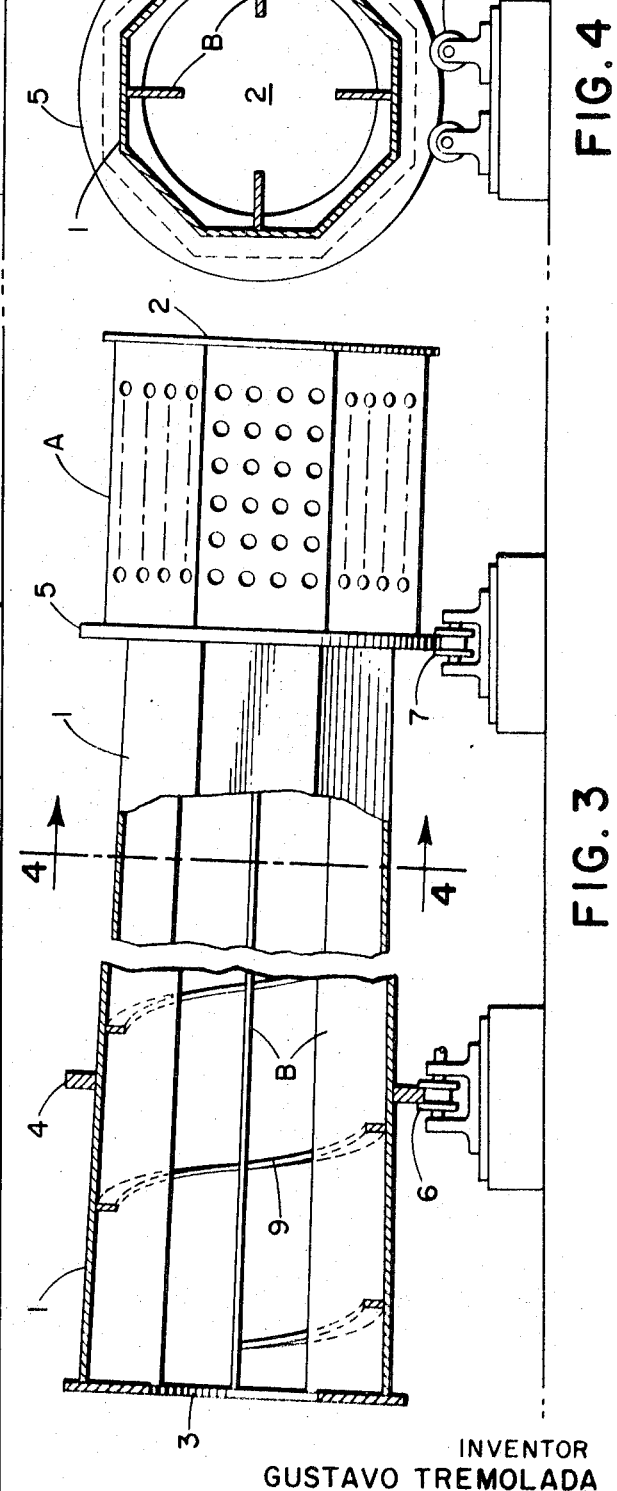

APPARATUS FOR SELECTIVELY CRUSHING OF STORAGE BATTERIES AND SEPARATING THE COMPONENT MATERIALS

This is a division of application Ser. No. 497,375, filed Oct. 18, 1965 now U.S. Pat. No. 3,456,886, issued July 22, 1969.

The invention relates to apparatus for treating storage batteries, particularly lead batteries, for recovering their constituent materials.

More precisely this invention relates to apparatus for separating the active material, substantially in the pure state and practically completely, from the remaining constituents of scrap batteries or their parts, while said remaining materials are obtained in such sizes as to be easily separated by means of other subsequent processes.

The separation apparatus according to the present invention is realized through means which provide a controlled crushing of batteries or their parts and a screening, or equivalent operation, of the obtained fragments as described hereafter in greater detail.

In what follows reference will be made, for simplicity sake, only to lead storage batteries, with the understanding that what is hereafter indicated for acid batteries is also true for other types of batteries when expedients and modifications within the reach of the expert are applied.

As well know, the main constituents of batteries, not considering the electrolyte which, generally, is eliminated before the treatment, are:

1. a box-shaped vessel of ebonite or other various materials, hereafter named container:
2. electrode grids of lead-antimony alloy and, in some cases, with other minor constituents:
3. electrical connections, among the grids and with external circuits, made of lead-antimony alloy. Components 2 and 3 as a whole will be indicated, in what follows, as "metallic components:"
4. active material, formed by lead oxide and lead sulfate:
5. separators generally made of wood, or fiber glass, or synthetic resins.

The recovery of the lead contained in the batteries as active material and the metallic components, according to the known processes is realized:

a. by direct metallurgical treatment of batteries as such:

b. roughly separating by expensive manual selection, on one side the active materials and the metallic components, and on the other side the fragments of containers and separators and then treating metallurgically the mixture of active material and metallic components.

Group (a) processes present the disadvantage that incombustible substances, e.g., the compounds of alkaline earth metal contained as filler in the container, slow down the melting furnace operation, and that the considerable sulfur content of the container, when of ebonite, gives birth to lead byproducts.

Group (b) processes although they are easier to conduct, give higher lead yields and require lower installation expenditure than type (a) processes, present, this notwithstanding, the main disadvantage of requiring a large use of manpower.

Moreover both group (a) and group (b) processes present the serious inconvenience that they give birth, during the fusion of the material, to a lead-antimony alloy having from 2 to 4 percent by weight of antimony. Said alloy cannot be used for grid manufacture which requires 4 to 8 percent of antimony alloys, nor for lead-oxide manufacture which requires pure lead.

This situation is due to the fact that heretofore it has not been practically possible to completely separate, by means of an industrial process, substantially pure active material through the process and equipment (e.g. jaw crushers, hammer crushers and the like) employed up to now for battery crushing. This is because said known processes and equipment cause an indiscriminate crushing of the various materials composing the batteries, and therefore it is impossible to separate them e.g., by a simple screening operation.

We have found that is possible to eliminate said inconveniences through a new industrial process and through easily realizable apparatuses which, instead of separating the active material together with the metal components, permit the separation of the active material alone.

Therefore the first object of the which invention is to provide equipment for practically totally separating the substantially pure active components material from the other components of the batteries.

Other objects are to provide means which allow a full mechanization of the operation of crushing the batteries while obtaining the various components of the same, in substantially different sizes, thus realizing the first above-mentioned scope of the invention and, moreover, avoiding the burdensome restrictions of type (a) processes as well as the expensive manual selection inherent to type (b) processes;

allows a nearly full recovery of the metallic compounds obtained in mixture with the nonmetallic ones, active material excluded;

avoids indiscriminate crushing of said components, from which the active material has been completely, or almost completely, removed;

affords, by separately melting the active material and the metallic components, a lead with an antimony content of about 1 percent or less of easy valorization and a lead-antimony alloy with about the same antimony content as that of the metallic components of the batteries.

A further object of the invention is to realize suitable apparatuses for actuating the process.

Those and other objects will be apparent to the man skilled in the art from the following description of the invention.

We have found that for realizing the objects of the present invention, is is necessary to submit batteries or their parts to a mechanical action consisting of a succession of blows, controlled in intensity and number in such a way as to detach practically all the active material prevalently as powder or fine granules, while the remaining materials are obtained in fragments or in particles of a size substantially greater than those of the active materials.

The intensity degree of blows is expressed by the value of the kinetic energy in the relative motion; of the batteries with respect to the walls, or of the heavy masses with respect to the batteries; said energy transforms itself into breaking, detaching, deformation work, etc.

The relative motion of the batteries with respect to the walls or of the heavy masses with respect to the batteries, may be realized by putting into motion the batteries alone, or the walls alone, or the heavy masses, or both the batteries and the walls. As heavy masses may also be used, wholly or partially, other batteries or parts thereof may also be subjected to such a treatment.

We have found that is far preferable to decrease the intensity of the blows while the operation proceeds to its completion.

Thus, by graduating the intensity of the blows, it is possible to conveniently avoid crumbling of the metallic and nonmetallic components which otherwise would pass through the screen openings, degrading the active material. If blows are produced, e.g., by letting batteries fall on walls, the height of fall may be reduced gradually while the operation is brought to completion, or else successive blows may be made to occur interposing relatively soft materials, or on less rigid walls; in case both expedients may be adopted simultaneously.

Anyhow it is understood that: the crushing of the containers may also be realized in a preceding and distinct phase from those of detachment and separation of the active material from the other constituents; further, these two last phases may be realized at the same time or separately.

Besides, it is evident for the man skilled in the art, that instead of performing the active material separation through screening, it is also possible to use, without departing from the spirit of the invention, other known separation processes, e.g., those which utilize a fluid flow.

Some means suitable for the realization of the process according to the present invention, are hereafter described.

A. FIG. 1 represents a vertical, longitudinal section of a crushing drum apparatus having a circular cross section and provided with a screen at its end.

FIG. 2 is a section taken along line 2—2 of FIG. 1.

FIG. 3 represents a vertical, longitudinal cross section of an alternate form of crushing drum in which the cross section is polygonal, as shown in FIG. 4.

FIG. 4 is a cross-sectional view of the polygonal drum along line 4—4 of FIG. 3.

In the several Figures, like parts are identified by the same numerals.

Referring to FIG. 1, the apparatus comprises the cylinder 1, the axis of which is sloped, of about 2° from the horizontal, toward the discharge mouth 2, the batteries are fed into the charging mouth 3.

The external rings 4 and 5 are supported by rollers 6 and 7, respectively. Roller 6 is rotatively driven by a motor, not shown, and by frictional engagement with ring 4 causes the drum to turn about its longitudinal axis in the known manner.

The drum is internally provided with longitudinal wings 3 which, during the rotation, lift the batteries, or parts thereof, letting them fall from a practically constant height, onto the drum lower wall. The drum is also provided with a spiral 9, made of flat bars, which starts near the drum charging mount and extends for a certain length. Said spiral increases the advancing speed of the material in correspondence with and in the neighborhood of the charging mouth, allowing therefore batteries to fall on walls cleared, or nearly so, of batteries or parts thereof. The discharging and of the drum wall is provided with openings or bores, the diameters of which are comprised within 2 and 30 mm. comprising a screening means integral therewith for separating the active material. The number of blows is determined among other things, by the drum length and by the rotation speed, while the blow intensity is a function of the drum diameter. In the drum 10 of FIG. 2, the cross section is polygonal, instead of circular, otherwise the internal structure and arrangement represented by 9 and B are the same as in drum 1, and like means 6 and 4 provide for rotating the drum in operation.

The number of blows the material undergoes during its stay in the drum, may vary from 20 to 100 and more. The graduation of the blow intensity in the apparatuses of this type may be obtained by letting a bed of crushed material be formed, which increases its thickness towards the drum discharge and becomes softer, or appropriately distributing, within the drum, bodies provided with protrusions or sharp corners, or also reducing the diameter of the drum which thus assumes a truncated cone or truncated pyramid shape towards the discharge mouth.

It is evident that many changes may be brought out by the described apparatuses, e.g., the revolving drum axis may be horizontal and the material advancement may be realized by means of water jets, thus obtaining a contemporaneous separation of the detached active material and facilitating said detachment. With an apparatus of the type illustrated in FIGS. 1 and 3, of 2 m. diameter, fed with scrap automobile batteries, a practically complete separation of substantially pure pulverulent active material was obtained; moreover the average size of metallic components and of ebonite pieces and/or of other materials discharged from the drum, was comprised between 4 and 12 cm., and prevailingly of 8 cm. size.

B. An other suitable apparatus for realizing the process according to the invention is essentially constituted by a belt conveyor, provided with rigid bottom elements, running between two sturdy fixed flanks. During their motion the batteries charged onto the belt are hit by heavy masses, then lifted. The weight and height of fall of said masses or both are preferably made to decrease gradually while crushing proceeds. The blow frequency is commensurate with the advancement speed of the belt so that each battery or its parts receives on the average the chosen number of blows of suitable and various intensity. The crushed materials are then sent onto a screen with openings of 8 mm. diameter, thus separating the active material from the remaining parts.

C. The apparatus is constituted essentially by a belt conveyor running between sturdy flanks, the walls of which are segmented and movable with a to-and-fro movement perpendicular to the belt advancement direction.

During their movement, the batteries charged onto the belt are hit by the mobile segments the reciprocating motion of which is commensurate with the belt advancement speed so that each battery undergoes a suitable number of blows thus breaking the container and detaching the powdered active material, which is thereafter separated through screening or also through sedimentation or the equivalent processes.

D. The apparatus is essentially constituted by an oscillating or vibrating screen provided with mobile segmented flanks similar to those of the item C apparatus.

The crushing of the containers of the batteries, the detachment and pulverization of the active material, occur similarly as in the preceding example, with the difference that with this apparatus the separation of the active material takes place during the crushing operation.

As already mentioned, the material substantially free from active material is discharged, from the crushing device of the present invention, in such sizes as to facilitate the subsequent separation of the metallic and nonmetallic components.

I claim:

1. Apparatus for a selective breaking of lead storage batteries and for the separation of the active material from the remaining material which comprises: a revolving drum having a charging end and a discharging end, a plurality of lifting wings on the internal walls of said drum and extending longitudinally parallel to the axis of said drum, and screening means having apertures in the range of 2 to 30 mm. adjacent the discharge end of said drum, said drum having a cross section decreasing in diameter from the charging end to the discharging end and its axis is sloped towards said discharging end.

2. Apparatus according to claim 1 wherein the drum is further provided with a plurality of spiral elements extending from near the feed end of said drum towards the discharge end thereof.

3. Apparatus according to claim 1 wherein the screening means is integral with the drum.

4. Apparatus according to claim 1, wherein the drum is circular in cross section.

5. Apparatus according to claim 1, wherein the drum is polygonal in cross section.